July 5, 1960  K. L. KELLY ET AL  2,943,834
MOUNTING PLATFORM FOR AIR CONDITIONING UNITS
Filed April 8, 1958  3 Sheets-Sheet 1

INVENTORS
Kenneth L. Kelly
BY  Donald E. Hoffman
Joseph D. Lear
Atty.

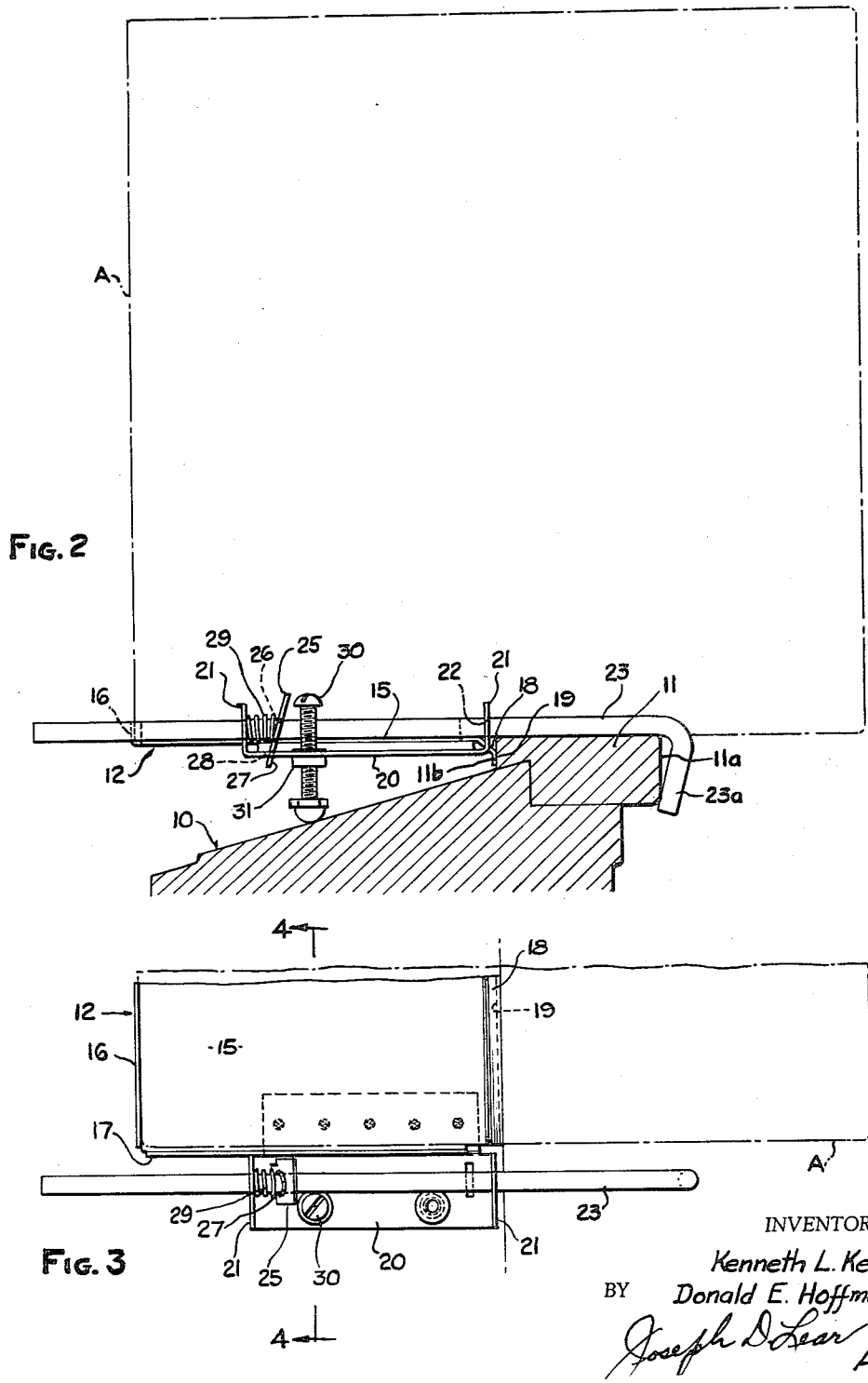

July 5, 1960   K. L. KELLY ET AL   2,943,834
MOUNTING PLATFORM FOR AIR CONDITIONING UNITS
Filed April 8, 1958   3 Sheets-Sheet 3

INVENTORS
Kenneth L. Kelly
Donald E. Hoffman
BY Joseph D. Lear
Atty

United States Patent Office 2,943,834
Patented July 5, 1960

2,943,834

MOUNTING PLATFORM FOR AIR
CONDITIONING UNITS

Kenneth L. Kelly, Tonawanda, and Donald E. Hoffman, West Seneca, N.Y., assignors to Fedders Corporation, Maspeth, N.Y.

Filed Apr. 8, 1958, Ser. No. 727,091

7 Claims. (Cl. 248—208)

This invention relates to air conditioning units of the window mounted type.

In the original installation of a window mounted unit, it has been customary to provide a mounting kit of considerable complexity which has required the services of a skilled mechanic for proper and safe installation. Such installations have been made with a view to permanency and have involved the mutilation of window casings with screw holes for brackets and similar supporting means. It is an object of the present invention to simplify this practice by providing a mounting platform for a unit which may be installed, levelled into position, and firmly affixed to the sill of a window casing of any proportions in a fashion so effective that the use of tools is not required. As a result of the use of the invention, units, together with their mounting platforms may be shifted from window to window without mutilation of the window casings and with an appreciable saving in labor.

The invention will be more fully understood by a perusal of the accompanying specification and drawings wherein:

Fig. 2 is a side view thereof on an enlarged scale with the window sill shown in section;

Fig. 3 is a fragmentary top view of Fig. 2;

Figure 1:
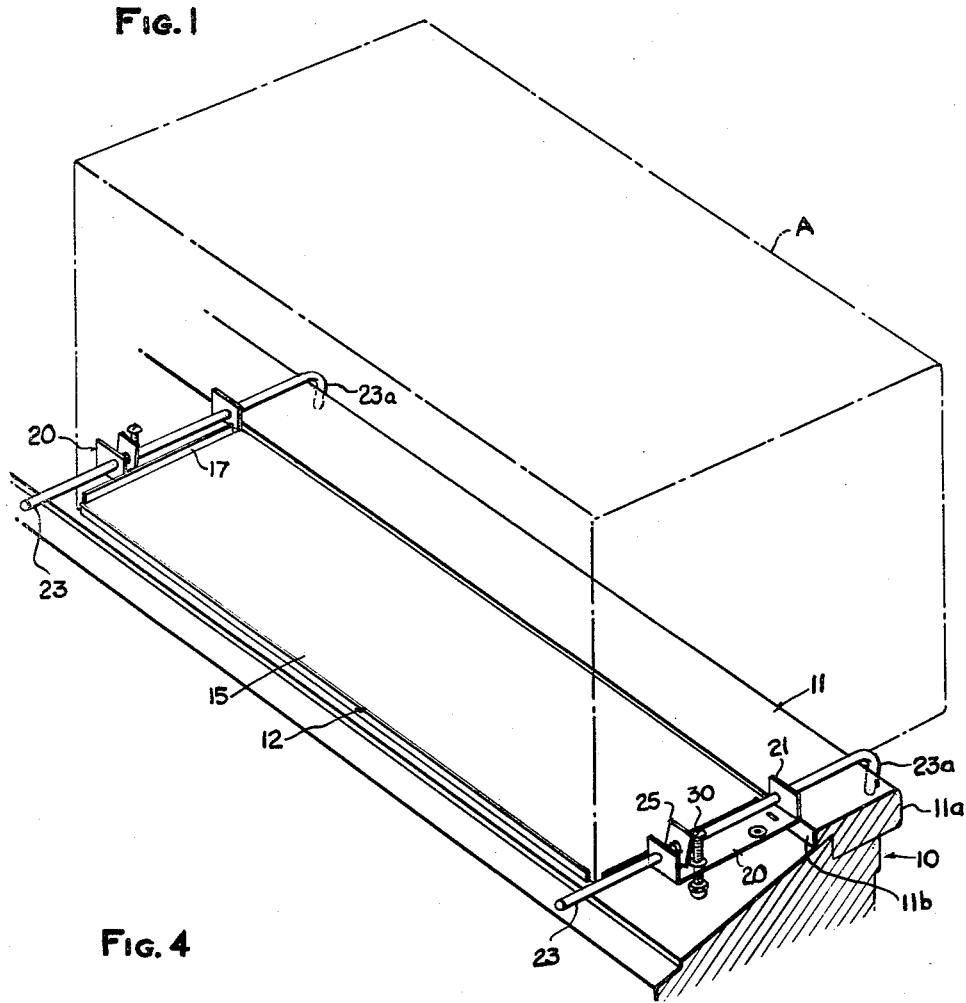
Fig. 1 is a perspective view of a mounting platform as applied to a window casing.
Figure 4:
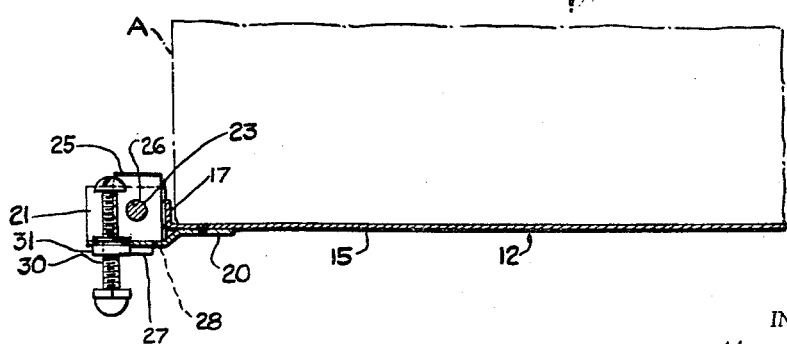
Fig. 4 is a section on the line 4—4 of Fig. 3.

In the drawings, the invention is shown organized with a window structure of the double hung sash type, with the sill 10 and the stool portion 11 of the sill serving as the base for the mounting platform 12 of the invention. The air conditioning unit A is of the familiar rectilinear type and it is wholly positioned on the platform 12.

In the embodiment of the invention shown in Figs. 1 to 4, the platform 12 includes a mounting base or plate 15 having an upturned outside or back flange 16 and side flanges 17 for receiving the base of the unit A. The plate 15 is provided on its front edge with an angular flange 18 merging into a depending flange 19. Side extensions 20 are welded to each end of the plate 15 (Fig. 4) and their projecting portions are formed with spaced vertical flanges 21 having bearing openings 22 which are aligned with reference to the sides of the plate 15. A rod 23 is slidably entered in each pair of bearing openings 22, and as will be observed in Fig. 2, the openings are so located that the bottom of the rods lie in the plane of the plate 15. The inner ends of the rods 23 are provided with hook portions 23a which engage about the inside edge 11a of the stool 11 with the body of the rods resting on the surface of the stool 11.

Means are provided for adjustably securing the rods to the platform and it is preferred that such a connection be of the fast action or ratchet type. A ratchet plate 25 is provided with an aperture 26 which is loosely entered by its rod 23, and it is also provided with a shouldered extension or key 27 which is loosely received in a slot 28 in the underlying body of the side extension 20. A coil spring 29 is engaged about the rod 23 and it abuts the adjacent bearing flange 21 and the plate 25, thus forcing the plate to an angular locked position as shown in Fig. 2. Vertical adjusting screws 30 are carried in nuts 31 welded in the side extensions 20.

In applying the platform to a window, the long depending flange 19 is held against the outside edge 11b of the stool 11 and the portions 23a of the rods 23 are then thrust into tight engaging position with the inside edge 11a. The ratchet mechanisms automatically lock the rods against retrograde movement and thus the assembly is firmly fixed. The adjusting screws 30 are now manipulated for minor corrections in the level of the plate 15 and to serve also as supporting feet. The air conditioning unit A may now be slid into position over the stool 11 and on the coplanar plate 15, with the vertical flanges 16 and 17 serving as guiding and positioning means. It will be observed that the angular flange 18 serves as a gap on the under side of the unit to prevent entry of water by capillary action thru the adjoining unit bottom and sill stool.

Figure 6:
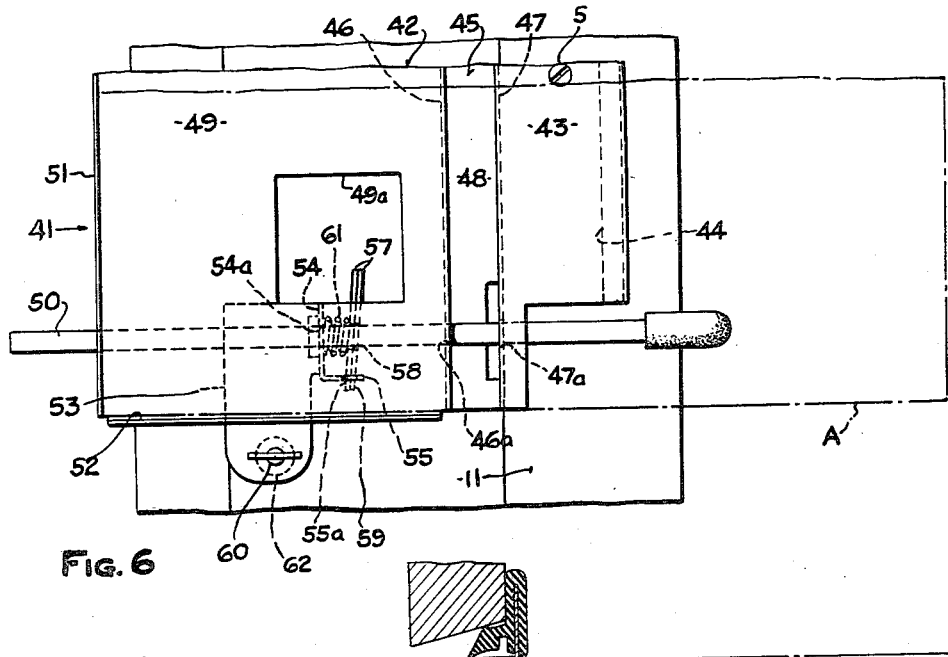
Fig. 6 is a fragmentary top view of Fig. 5.
Figure 5:
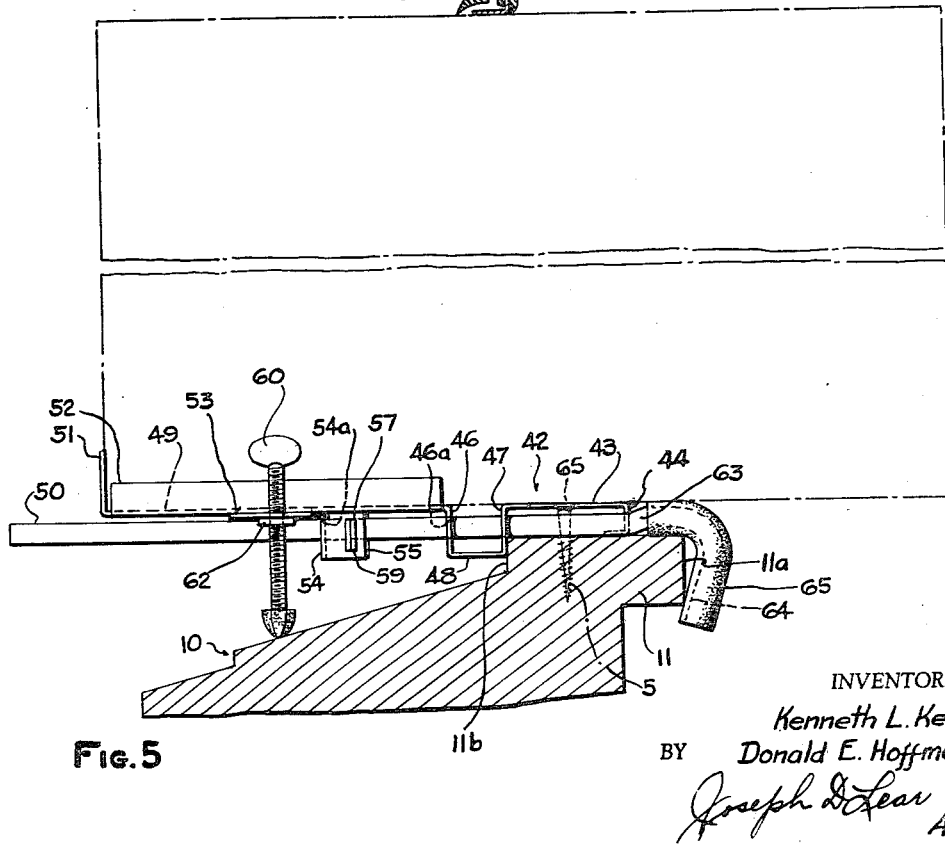
Fig. 5 is a side view of another embodiment of the invention.

In the embodiment of the invention shown in Figs. 5 and 6, a functionally similar structure is presented, with the exception that the locking rods 50 thereof are concealed when a unit A is positioned on the mounting platform 41 thereof. The mounting plate 42 thus has a plate portion 43 overlying the stool 11 spaced therefrom by a front edge defined by a U-shaped depending flange 44 which rests on the surface of the stool 11. The body of the plate 42 is formed with a depressed portion 45 having depending walls 46, 47 and a bottom 48, the inside wall 47 serving as a shoulder to contact the outside edge 11b of the stool 11.

The outside plate portion 49 of the mounting plate 42 is coplanar with the portion 43, and it is formed with an upstanding back flange 51 and side flanges 52. Side extensions 53 are welded beneath each side of the plate portion 49 and they each have a depending structure defining angularly related flanges 54 and 55. A locking rod 50 is mounted adjacent each end of and within the confines of the mounting plate structure. Each rod 50 extends transversely thru a clearance hole 47a in the inside wall 47 and aligned bearing apertures 46a and 54a in the wall 46 and flange 54, respectively. Preferably, although not necessarily, the rods 50 rest on the surface of the stool 11, and are thus coplanar with the bottom of the flange 44.

A pair of ratchet plates 57 are mounted on each rod 50, such plates having apertures 58 which loosely receive the rods as in the first embodiment of the invention. The plates 57 are also formed with shouldered extensions 59 which are horizontally engaged in an oversized rectangular opening 55a in each flange 55 of the side extensions 53. Openings 49a in the outside plate portion 49 of the mounting plate 42, provide access to the underlying ratchet plates 57. A coil spring 61 disposed about each rod 50, engages the flange 55 and the adjacent plate 57 to retain the plates 57 in locking engagement with the rod 50. Each side extension 53 projects beyond the sides of the plate 42 and is provided with a welded nut 62 for receiving a vertical adjusting screw 60.

As shown in Fig. 5, the inner ends of the rods 50 are each formed with a raised portion 63 terminating in a hook portion 64. A rubber sleeve 65 is engaged over such portions of each rod 50 to serve as a protection for the stool 11 and stool edge 11b. In this embodiment, when a unit A is disposed on the mounting plate 42, the mounting plate 42 and accompanying rods 50 are concealed as viewed from inside the dwelling. When it is desired to move the unit A to another room, the unit A is removed from the plate 42 thus exposing the ratchet plates 57 thru the openings 42a. The plates may then be pressed to release the rods for retraction and removal of the platform structure. The mounting platform, although primarily intended for an easily removable installation, may be converted into a permanent installation by screws 5 disposed thru holes 65 in the mounting plate, and entered in the underlying stool 11. In such installations the mounting rods 50 and associated ratchet structure may be dispensed with.

It will be appreciated by those skilled in the art, that various types of windows and proportionally differing shapes and sizes of air conditioning units may incur modifications of the mounting platform structure within the scope of the inventive principle as set forth in the appended claims.

We claim:

1. For use with a window structure having a sill including a stool portion, a mounting platform for an air conditioning unit comprising a base for receiving said unit, said base being a planar sheet metal structure to be disposed in supporting relation beneath said unit for the entire width thereof and having an elongated edge portion adapted to be brought in contact with the outside edge of a window stool, spaced levelling screws mounted for vertical adjustment in said base for contact with the sill of a window, a pair of spaced rods mounted for lateral sliding movement in said base in parallelism to said base, said rods being adapted to be positioned on the surface of the stool and including means for engaging the remaining vertical edge of a window stool, and means for locking said rods with said base.

2. For use with a window structure having a sill including a stool portion, a mounting platform for an air conditioning unit comprising a base for receiving said unit, said base including an elongated edge portion and transversely disposed spaced pairs of bearing structures, a rod slidably mounted in each pair of bearing structures, said edge portion being adapted to engage the outside edge of said stool portion, and said rods having terminal portions for engaging the opposite edge of said stool portion, ratchet mechanisms carried by said base and engageable with each rod, releasing means for said mechanisms to permit removal of said rods, and levelling means carried by said base and engageable with said sill remote from said stool portion.

3. For use with a window structure having a sill including a stool portion, a mounting platform for an air conditioning unit comprising a base for receiving said unit and having a depending portion for abutting the outside edge of the stool portion, spaced levelling screws mounted for vertical adjustment in said base for supporting contact with the window sill remote from said stool portion, transversely disposed pairs of bearing structures carried by said base, a rod slidably mounted in each pair of bearing structures, each rod having a terminal portion adapted to engage the inner edge of said stool portion, and means carried by the base and engageable with each rod for locking said rods against removal.

4. For use with a window structure having a sill including a stool portion, a mounting platform for an air conditioning unit comprising a base for receiving said unit and having a depending portion for abutting the outside edge of the stool portion, spaced levelling screws mounted for vertical adjustment in said base for supporting contact with the window sill remote from said stool portion, transversely disposed pairs of bearing structures carried by said base, a rod slidably mounted in each pair of bearing structures, each rod having a terminal portion adapted to engage the inner edge of said stool portion, said bearing structures being suitably related to said base to permit said rods to rest on said stool portion, and means carried by the base and engageable with each rod for locking said rods against removal.

5. For use with a window structure having a sill including a stool portion, a mounting platform for an air conditioning unit comprising a base for receiving said unit and having a marginal depending portion adapted to be supported on said stool portion and a parallel and spaced depending portion adapted to abut the outside edge of said stool portion, spaced levelling screws mounted for vertical adjustment in said base for supporting contact of the sill of a window remote from said stool portion, transversely disposed pairs of bearing structures carried on the under side of said base, a rod slidably mounted in each pair of bearing structures, each rod having a terminal portion adapted to engage the inner edge of said stool portion, and means carried by the base and engageable with each rod for locking said rods against removal.

6. For use with a window structure having a sill including a stool portion, a mounting platform for an air conditioning unit comprising a base for receiving said unit and having a marginal depending portion adapted to be supported on said stool portion and a parallel and spaced depending portion adapted to abut the outside edge of said stool portion, spaced levelling screws mounted for vertical adjustment in said base for supporting contact of the sill of a window remote from said stool portion, transversely disposed pairs of bearing structures carried on the under side of said base, a rod slidably mounted in each pair of bearing structures, each rod having a terminal portion adapted to engage the inner edge of said stool portion, said bearing structures being suitably related to said base to permit said rods to rest on said stool portion, and means carried by the base and engageable with each rod for locking said rods against removal.

7. For use with a window structure having a sill including a stool portion, a mounting platform for an air conditioning unit including a sheet metal base for receiving said unit and having a marginal depending flanged edge adapted to be supported on said stool portion, said base being formed with a central depressed portion parallel to said edge and adapted to abut the outside edge of said stool portion, a depending flange member on the under side of the base adjacent each end of the base, transversely aligned bearing openings in the flange members and said depressed portion of said base, rods carried slidably in the bearing openings, each rod having a hook-like terminal adapted to engage the inner edge of said stool portion, extensions projecting from each side of said base and having vertical nut portions, screws carried by said nut portions and adjustable into contact with said window sill remote from said stool, and means carried by said base and engageable with each rod for locking said rods against removal.

References Cited in the file of this patent
UNITED STATES PATENTS
2,628,052    Cira _____ Feb. 10, 1953